UNITED STATES PATENT OFFICE.

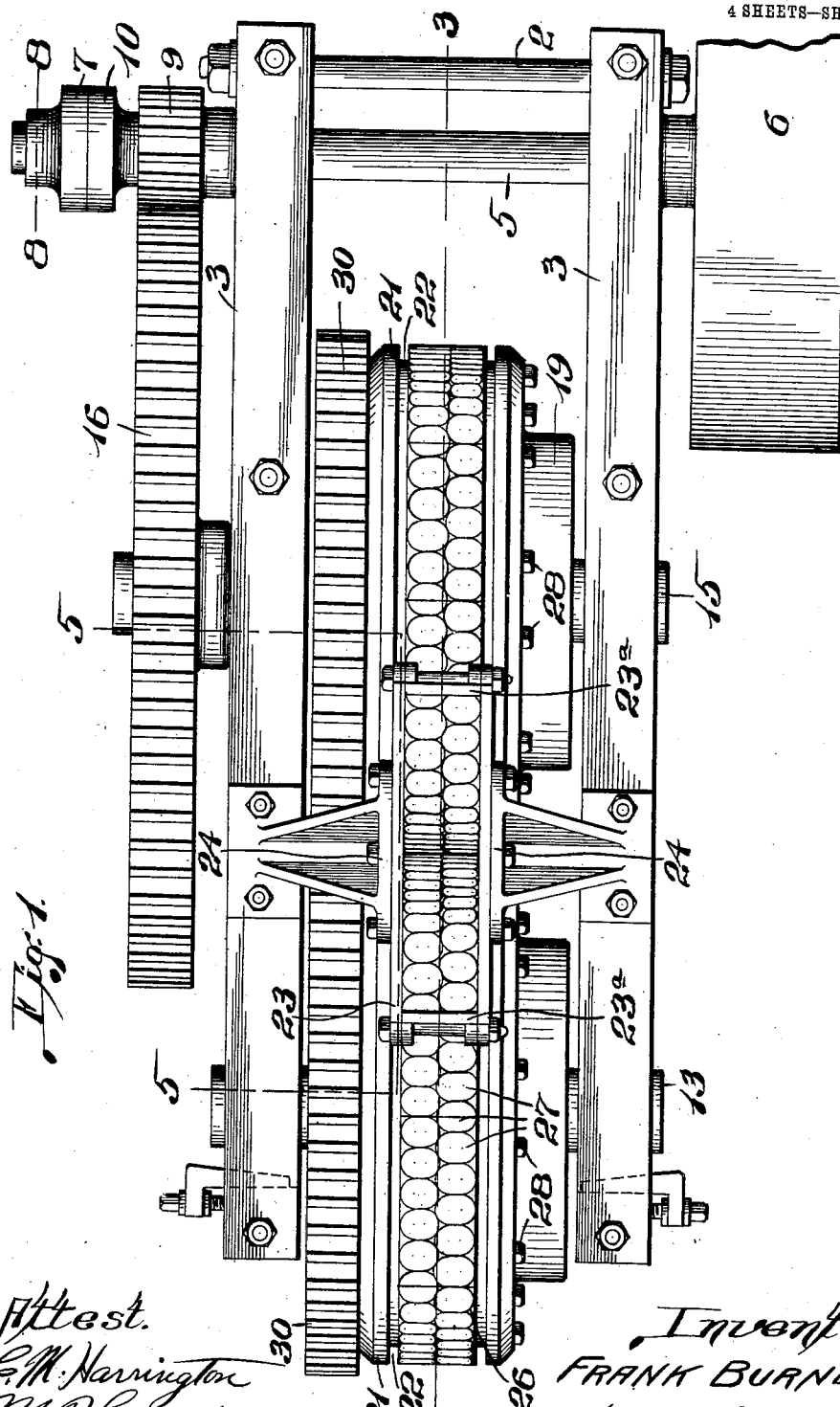

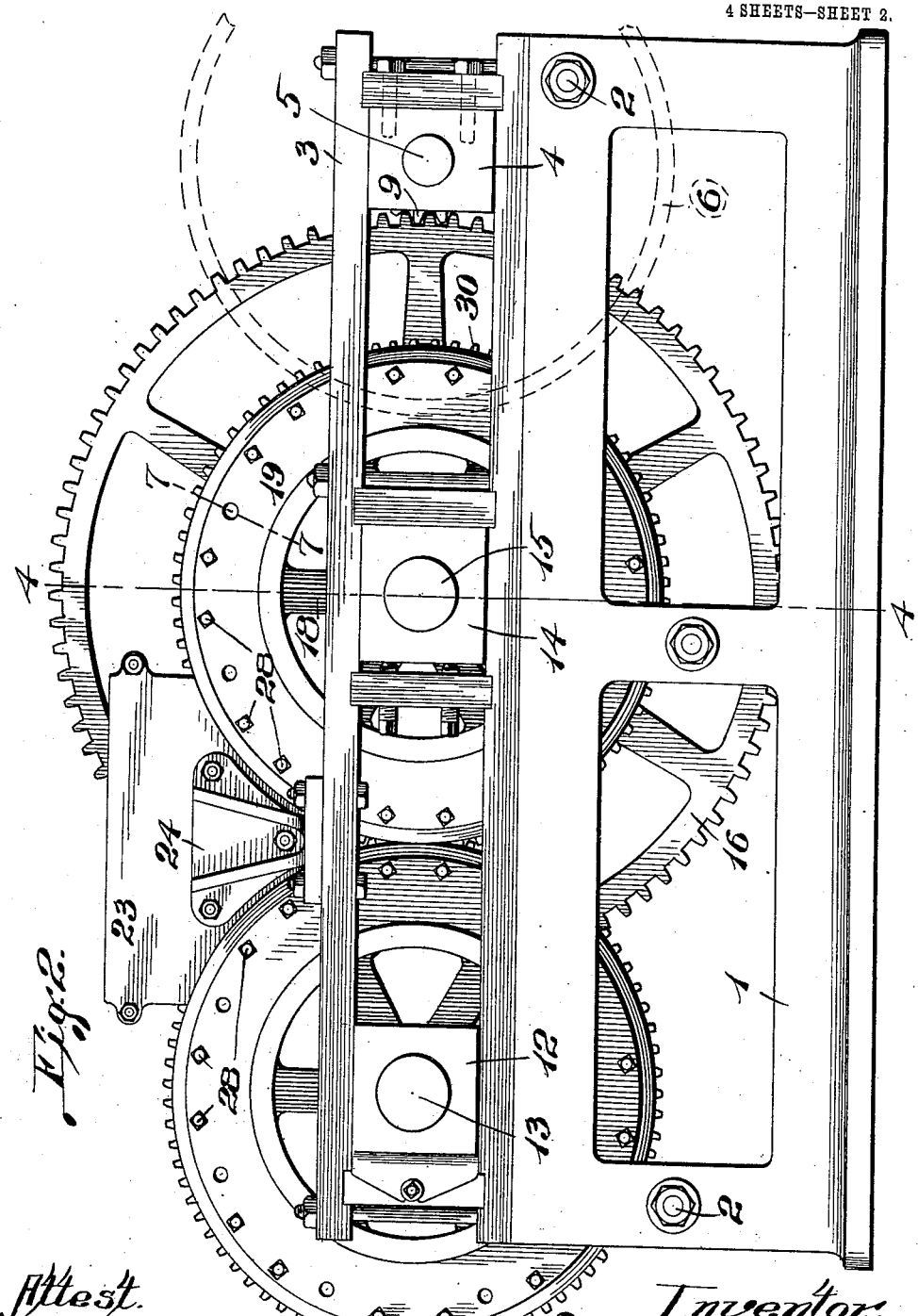

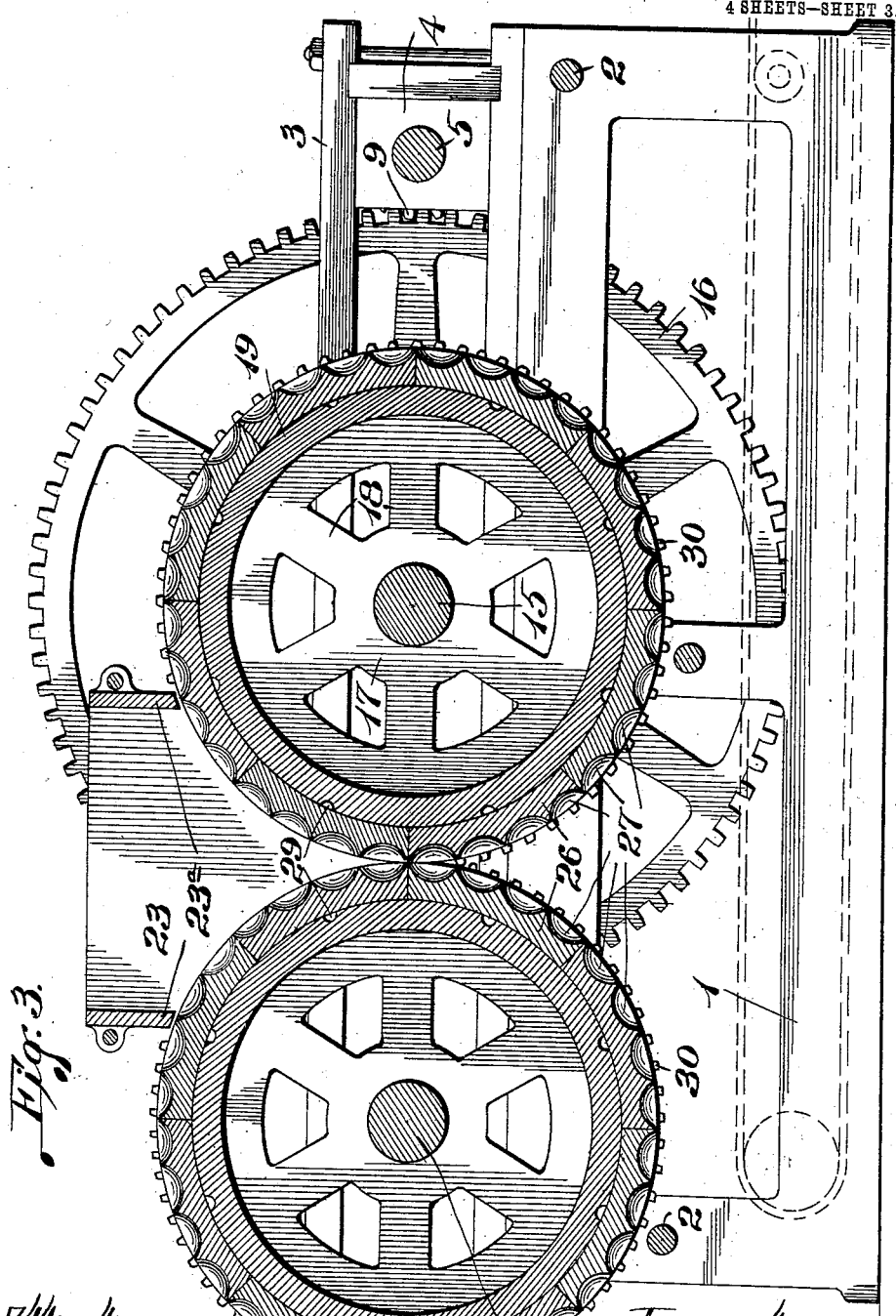

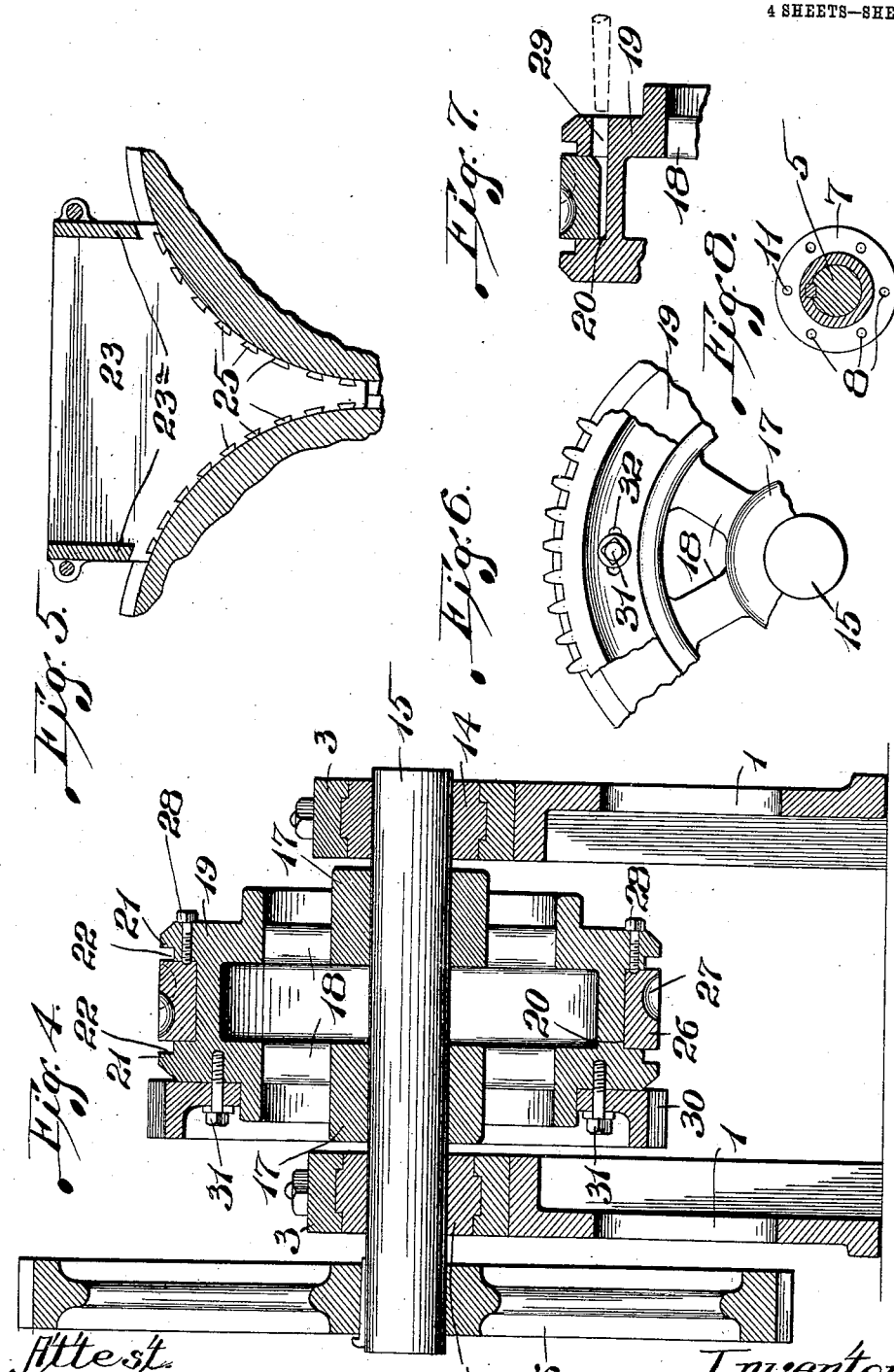

FRANK BURNES, OF ST. LOUIS, MISSOURI, ASSIGNOR TO AMERICAN FUEL COMPANY, OF ST. LOUIS, MISSOURI, A CORPORATION OF ARIZONA TERRITORY.

BRIQUET-MACHINE.

No. 915,332.      Specification of Letters Patent.      Patented March 16, 1909.

Application filed October 14, 1907. Serial No. 397,434.

*To all whom it may concern:*

Be it known that I, FRANK BURNES, a citizen of the United States, and resident of St. Louis, Missouri, have invented certain new and useful Improvements in Briquet-Machines, of which the following is a specification containing a full, clear, and exact description, reference being had to the accompanying drawings, forming a part hereof.

My invention relates to a machine for forming fuel briquets from disintegrated material while the same is in a plastic condition, and my invention has for its object the provision of means whereby briquets are very rapidly formed, and the molds on the rotary heads of the machine being made in removable and interchangeable sections, thus permitting any one section to be removed should it become worn or broken from use.

To the above purposes, my invention consists in certain novel features of construction and arrangement of parts, which will be hereinafter more fully set forth, pointed out in the claims, and illustrated in the accompanying drawings, in which:—

Figure 1 is a plan view of a briquet machine of my improved construction; Fig. 2 is a side elevation of the machine; Fig. 3 is a vertical section taken on the line 3—3 of Fig. 1; Fig. 4 is a transverse section taken on the line 4—4 of Fig. 2; Fig. 5 is a detail section taken on the line 5—5 of Fig. 1; Fig. 6 is a detail elevation of a portion of one of the rotary heads of the machine, and showing the adjustment of the gear while on said head; Fig. 7 is a detail section taken on the line 7—7 of Fig. 2; Fig. 8 is a detail section taken on the line 8—8 of Fig. 1.

The body of the machine comprises a pair of upright frames 1, which are connected by heavy transverse bars 2, and rigidly fixed in any suitable manner on top of the frames 1 are the parallel rails 3; and fixed in any suitable manner between the right hand ends of these pairs of rails 3 are bearing blocks 4, in which is arranged for rotation a transversely disposed shaft 5. Fixed on one end of this shaft 5 is a belt wheel or pulley 6, and keyed on the opposite end of said shaft is a disk 7, through which is formed a plurality of apertures 8. Loosely mounted on the shaft 5, adjacent the disk 7, is a pinion 9, with which is formed integral a disk 10, which is provided with apertures which coincide with the apertures 8 in the disk 7. When the machine is in use, pins 11 are located in a number of the apertures in the disks 7 and 10, thus forming a rigid connection between the shaft 5 and the pinion 9.

Adjustably positioned between the left hand ends of the rails 3 is a pair of bearing blocks 12, in which is arranged for rotation a shaft 13; and adjustably held between the rails 3, at points intermediate the blocks 4 and 12, are bearing blocks 14, in which is arranged for rotation a shaft 15. Fixed on the rear ends of the shaft 15 is a large gear wheel 16, which meshes with and is driven by the pinion 9. The rotary heads or sectional mold carrying members are rigidly fixed on the shafts 13 and 15, between the side frames 1, and as said rotary heads are identical in construction, but one will be described. Each rotary head comprises a hub portion 17, made in two parts, and integral with each part are the spokes 18, the outer ends of which are formed integral with a heavy ring 19, in the periphery of which is formed a groove 20. Flanges 21 are formed integral with the edges of the ring 19, and when the sectional molds are positioned on the rotary heads, narrow grooves 22 are formed between the sides of the sectional molds and the flanges 21, into which grooves extend the lower ends of the side plates 23 of a hopper, which is positioned immediately above and between the rotary heads; and said side plates being held in position by a bracket 24 bolted to the upper pair of rails 3.

23ª designates the end walls of the hopper, which are bolted to the ends of the plates 23. The lower edges of the plate 23 are provided with dove-tailed notches 25, which are filled with a suitable frictionless metal, and said lower edges bear directly upon the bottom surfaces of the grooves 22.

Segmental mold plates 26 occupy the grooves 20 so as to form a complete ring around each rotary head; and formed in the outer surfaces of these mold plates are concave pockets 27, preferably oval in outline, which pockets are arranged in two rows, and the pockets of one row being offset from those of the opposite row.

The mold plates are rigidly held in position by means of bolts or set screws 28, which pass through one side of the rotary head and engage on the sides of said segmental plates; and formed through the side of the rotary head and extending beneath the center of each plate is an aperture 29, through which passes a suitable tool when the plates are removed from the head. The segmental plates are arranged on each of the rotary heads so that the pockets in said plates exactly coincide with one another, and the surfaces of the plates bear against one another as the heads are rotated, and thus the plastic material is molded by the coinciding pockets into oval briquets. Arranged on the rear sides of the rotary heads are meshing gear wheels 30, the same being adjustably positioned by bolts or set screws 31, which pass through slots 32 formed through the webs of the gear wheels, and being seated in the rotary heads. These gear wheels are made adjustable in order that the pockets on one set of segmental plates will exactly coincide with the corresponding pockets of the remaining set of plates, and thus insure the formation of perfectly smooth briquets.

When my improved machine is in operation, a belt operating on the wheel 6 drives the shaft 5, and the pinion 9 drives the gear wheel 16, thus rotating the shaft 15; and the opposite shaft 13 is driven at a corresponding rate of speed by reason of the meshing gear wheels 30.

The disintegrated material of which the briquets are formed is delivered in a plastic state to the hopper arranged above and between the rotary heads; and said material automatically feeds into the pockets 27, and as the pockets pass the center between the rotary heads, the material in said pocket is pressed and molded into shape; and as soon as said pockets separate after this formation of the briquet, the latter drops onto a carrier suitably arranged in the lower portion of the machine, (see dotted lines in Fig. 1,) and is conveyed thereby to a drier.

The bearing blocks 14 upon which the shaft 15 is mounted are adjustable to and from the bearing blocks 4, in order to take up any lost motion between the pinion 9 and gear wheel 16; and the bearing blocks 12, in which the shaft 13 is journaled, are adjustable to and from the bearing blocks 14 in order to maintain the recessed surfaces of the segmental mold blocks in contact with one another during operation.

To prevent the breaking of one or more of the mold plates, or of some of the other essential parts of the machine, by reason of a heavy object, such as a tool, stone, or piece of iron, accidentally entering the hopper, I have provided the disks 7 and 10, which receive a number of bolts or pins, and which latter will readily break when subjected to abnormal strain; and thus the driving shaft 5 will continue to operate after the rotary heads have been stopped by the foreign object.

Any one of the segmental molds may be easily and quickly removed by loosening the set screws 28 holding the plate which is to be removed, and then inserting a suitable tool through the aperture 29 beneath said plate.

A machine of my improved construction is very simple, strong, and durable, is operated with a minimum amount of power, very rapidly turns out the briquets, and the material of which the briquets are formed feeds automatically into the mold pockets.

I claim:—

1. In a machine of the class described, a frame, adjustable bearings arranged on said frame, a pair of shafts arranged in the bearings, circular heads fixed on said shafts, there being continuous grooves formed in the peripheries of the circular heads, segmental mold plates seated in the grooves formed in the heads and which mold plates are independently removable, a hopper fixed on top of the frame and arranged above and between the circular heads, gear wheels fixed on the circular heads for driving said heads toward one another at the same rate of speed, and one of which gear wheels is adjustable.

2. In a machine of the class described, a frame, adjustable bearings arranged on said frame, a pair of shafts arranged in the bearings, circular heads fixed on the shafts, there being continuous grooves formed in the peripheries of the circular heads, segmental mold plates seated in the grooves formed in the heads, means whereby said segmental mold plates are rigidly locked in position on the heads, there being recesses formed in the heads beneath the mold plates in which a suitable tool may be inserted to remove said mold plates, gear wheels fixed on the circular heads for driving the same toward one another at the same rate of speed, and one of which gear wheels is adjustable.

In testimony whereof, I have signed my name to this specification, in presence of two subscribing witnesses.

FRANK BURNES.

Witnesses:
M. P. SMITH,
E. L. WALLACE.